(12) United States Patent
Chowdhury

(10) Patent No.: US 7,374,367 B2
(45) Date of Patent: May 20, 2008

(54) METHODS FOR STABILIZING HEAVY METAL CONTAINING MATERIAL FOR DISPOSAL IN SATURATED ZONE

(75) Inventor: Ajit K. Chowdhury, Madison, WI (US)

(73) Assignee: RMT, Inc., Madison, WI (US)

( * ) Notice: Subject to any disclaimer, the term of this patent is extended or adjusted under 35 U.S.C. 154(b) by 0 days.

(21) Appl. No.: 10/610,749

(22) Filed: Jul. 1, 2003

(65) Prior Publication Data

US 2004/0024282 A1  Feb. 5, 2004

Related U.S. Application Data

(60) Provisional application No. 60/393,230, filed on Jul. 1, 2002.

(51) Int. Cl.
*B09B 1/00* (2006.01)

(52) U.S. Cl. .............. 405/129.2; 405/129.45; 588/259; 588/256

(58) Field of Classification Search ............ 405/129.1, 405/129.2, 129.45; 588/249, 250, 252, 256, 588/257, 259
See application file for complete search history.

(56) References Cited

U.S. PATENT DOCUMENTS

| | | | | |
|---|---|---|---|---|
| 3,635,034 A | * | 1/1972 | Gardner et al. | 405/266 |
| 4,118,243 A | * | 10/1978 | Sandesara | 588/256 |
| 4,981,394 A | * | 1/1991 | McLaren et al. | 405/129.65 |
| 5,569,152 A | * | 10/1996 | Smith | 588/256 |
| 5,740,546 A | * | 4/1998 | Hooper | 588/16 |
| 5,859,306 A | * | 1/1999 | Stanforth | 588/236 |
| 5,961,437 A | * | 10/1999 | Smith et al. | 588/249 |
| 6,004,069 A | * | 12/1999 | Sudbury | 405/129.9 |
| 6,379,543 B1 | * | 4/2002 | Bowman | 210/170 |
| 6,543,964 B2 | * | 4/2003 | Chowdhury et al. | 405/128.5 |
| 6,648,551 B1 | * | 11/2003 | Taylor | 405/129.25 |

* cited by examiner

*Primary Examiner*—John Kreck
(74) *Attorney, Agent, or Firm*—Quarles & Brady LLP

(57) ABSTRACT

A leaching-stabilized heavy metal-contaminated matrix can be stored in a subsurface saturated zone by contacting the matrix with an amount of an agent for increasing acid-neutralization capacity sufficient to provide the stored matrix a preselected permanence level.

21 Claims, No Drawings

METHODS FOR STABILIZING HEAVY METAL CONTAINING MATERIAL FOR DISPOSAL IN SATURATED ZONE

CROSS-REFERENCE TO RELATED APPLICATION

This application claims the benefit of provisional patent application No. 60/393,230, filed Jul. 1, 2002, which application is incorporated by reference as if set forth herein in its entirety.

STATEMENT REGARDING FEDERALLY SPONSORED RESEARCH OR DEVELOPMENT

Not applicable.

BACKGROUND OF THE INVENTION

Processes for stabilizing heavy metals (the metals in Groups IIA through VIA, including but not limited to lead, cadmium, arsenic, zinc and chromium) in a matrix to reduce leaching potential under induced or natural leaching conditions with treatment chemistries involving ferric iron are known. In typical land disposal environments, and particularly when the matrices treated according to the above processes are disposed beneath the surface, the acidity of the associated pore water can increase and can slowly neutralize the matrix alkalinity due, for example, to the presence of decaying vegetation in the vicinity of the disposed material or potential influx of groundwater. The increased acidity can initiate conditions for chemical and/or biological reduction of ferric iron ($Fe^{3+}$) present in the waste to ferrous iron ($Fe^{2+}$). If such a reduction occurs, heavy metals can be released in the groundwater because ferrous iron is not an effective immobilizing agent. As an example, arsenic has the potential to remobilize over time from material treated with ferric sulfate and magnesium oxide.

The materials treated according to prior processes disclose various chemistries for stabilizing heavy metal-contaminated materials in various matrices and leaching scenarios. Treated materials are then disposed in the non-saturated zone, generally in secure landfills equipped with engineered leachate control systems.

No prior process addresses long-term stability of the treated material, particularly when the treated waste is disposed in a saturated zone with potential for remobilization of the stabilized metals, particularly remobilization due to significant changes in the pore water chemistry over time initiated, for example, by ongoing contact of the disposed material with groundwater. Accordingly, existing stabilizing methods are inadequate for disposal of treated material in the saturated zone because of the potential for remobilization of the heavy metals. Processes that provide long-term stability of treated heavy metal-contaminated matrices disposed under saturated subsurface conditions are needed.

Stanforth (U.S. Pat. No. 5,037,479) discloses a method for treating solid hazardous waste containing unacceptable levels of leachable metals such as lead, cadmium, and zinc, which includes the steps of mixing the solid waste with at least two additives, a pH buffering agent, and an additional agent which is a salt or acid containing an anion that forms insoluble or non-leachable forms of the leachable metal, each agent being selected from a group of agents.

Stanforth et al. (U.S. Pat. No. 5,202,033) discloses a method for treating solid hazardous waste containing unacceptable levels of a leachable metal, such as lead, cadmium, arsenic, zinc, copper, and chromium, where the method includes the steps of mixing the solid waste in situ with a phosphate source or a carbonate source or ferrous sulfate. An additional pH controlling agent is optionally added under conditions that support reaction between the additive and pH controlling agent and the metals, to convert the metals to a relatively stable non-leachable form.

Hooykaas et al. (U.S. Pat. No. 5,430,235) discloses a process for solidifying an arsenic-contaminated matrix as a rock-hard product using high dosages of a clay material, an iron salt, a manganese salt, an oxidizer, and a hydraulic binder such as Portland cement. The process disclosed in U.S. Pat. No. 5,430,235 has several disadvantages. Because of the requirement for a hydraulic binder, the process includes a curing period of 7 days or longer. The process also results in significant bulking (volume increase) of the treated waste materials. If dosage levels are lower than those identified as preferred, it is difficult to achieve solidification.

Hooykaas et al. (U.S. Pat. No. 5,347,077) discloses a process for solidifying contaminated soil, sediment, or sludge that may contain arsenic by adding iron, manganese, aluminum salts, and Portland cement at dosages of 20 percent by weight and higher. Again, the process requires a curing period and has the additional disadvantage of high bulking after treatment. Hooykaas et al. use an oxidizing agent to oxidize organic matter, since it is difficult to solidify the waste matrix in the presence of organic matter.

U.S. Pat. No. 5,252,003 (McGahan) discloses a process for controlling arsenic leaching from waste materials by adding iron (III) ions and magnesium (II) ions, preferably in the form of iron (III) sulfate and magnesium oxide.

Hager (U.S. Pat. No. 4,723,992) discloses a process for fixing pentavalent arsenic in soil by adding metal salts or iron, aluminum, or chromium and a weak organic acid.

Falk (U.S. Pat. No. 5,130,051) discloses a process for encapsulating waste that contains toxic metals, including arsenic, by adding a mixture of alkaline silicate and magnesium oxide; and, optionally, borax, a concentrated acid, a reducing agent, and fly ash at high dosage rates.

U.S. Pat. No. 5,859,306 (Stanforth) discloses a process for arsenate stabilization using aluminum compounds and alkaline buffer.

U.S. Pat. No. 6,254,312 (Chowdhury et al.) discloses a process for stabilization of heavy metal-contaminated materials using pH control, ORP control, and adsorption-coprecipitation agents.

Treatment chemistries for stabilizing heavy metal-contaminated waste materials using $CaCO_3$ added as limestone (U.S. Pat. No. 4,889,640) or formed in situ (U.S. Pat. No. 5,275,739) are also known, but these do not address the issue of long term storage or stability in a saturated zone.

Acidic iron sulfate pollution termed "acid mine drainage" (AMD), characterized by a pH below about 2.0 which has devastating effects on the environment, kills virtually all microbial and vegetative life it contacts and mobilizes various heavy metals such as lead, cadmium, mercury, copper, arsenic, chromium, selenium, antimony, zinc from the mine tailings of various mining operations such as coal processing, sulfide ore processing and the like, or from the surrounding soil matrix. Such mine tailings contain iron pyrite ($FeS_2$) which, over time, reacts with air and water, is converted microbiologically into ferrous sulfate and sulfuric acid. The ferrous iron thus formed further converts to the ferric form and accelerates the pyrite oxidation, thereby creating more ferrous sulfate and sulfuric acid. The rate limiting step in production of AMD is the ferrous to ferric oxidation. Microbial oxidation by *Thiobacillus ferrooxidans* increases the ferrous oxidation rate by a few orders of magnitude.

U.S. Pat. No. 5,362,394 describes a process for controlling AMD using a permeable reactive barrier (PRB) containing organic carbon downstream of the waste impoundment to intercept the plume that contains ferrous sulfate and sulfuric acid. However, a downstream PRB treats only the symptoms of AMD but does not prevent the problem in the first instance. Moreover, known AMD control processes do not address long term permanency of the solution and can be cost prohibitive to implement.

BRIEF DESCRIPTION OF THE SEVERAL VIEWS OF THE DRAWINGS

Not applicable.

BRIEF SUMMARY OF THE INVENTION

The present invention describes a cost-effective process for disposing a leaching-stabilized heavy metal-containing matrix in a saturated zone whereby the long-term remobilization potential of the heavy metal is reduced. As the term is used in this application, a "saturated zone" comprises a porous medium such as soil or rock below a prevailing groundwater table, and can include unconfined and confined aquifers, aquitards, and the capillary fringe, as well as the perched zones above the water table, as well as a non-saturated zone above the water table having a potential for exposure to precipitation or surface water infiltration such that non-saturated zone can become saturated.

According to the process, the leaching-stabilized matrix is placed at a subsurface site in a saturated zone in contact with an agent for increasing the acid neutralization capacity (ANC) of the leaching-stabilized matrix in amount sufficient to increase the permanence of the matrix to a preselected level. The matrix preferably has sufficient permanence that leaching from the matrix is at or below levels permitted under a relevant test mandated by a US state or federal agency charged with regulating environmental protection, such as the leaching tests mentioned herein. The leaching-stabilized matrix can be formed in a known manner (see, e.g., according to the methods for stabilizing the waste matrix in U.S. Pat. No. 6,254,312 (Chowdhury et al.), incorporated herein by reference as if set forth in its entirety). The matrix treated in accordance with the present invention can be stabilized in situ by addition of various treatment chemicals and mixing in place or it can be stabilized ex situ above ground and then disposed in the saturated zone.

The agent for increasing the ANC can be intimately mixed with the stabilized matrix or can be provided in groundwater that flows into the stored matrix in the saturated zone. It is understood that the stabilized matrix that is stored can contain or not contain water at the time of storage, but also that recognition of the pore water characteristics in the matrix after storage are important to successful practice of the invention. In prior methods, wherein the treated material is stored in the non-saturated zone with institutional controls, it would have been unnecessary to increase the ANC of the stabilized matrix, and the methods and agent used in the present invention would be viewed as creating an unnecessary expense.

One aspect of the invention is a long-term control of the pore water pH of the stabilized matrix disposed in a saturated zone. Maintaining a slightly basic pore water pH in the vicinity of the treated waste provides a very low potential for remobilization of immobilized metal species and this is considered a preferred outcome of the method. A slightly basic pore water pH neutralizes organic acids formed by biodegradation of vegetation, etc., and inhibits the activity of sulfur- or iron-reducing microorganisms, thereby substantially eliminating the pathways for potential reduction of ferric iron to the ferrous form or remobilization. In the case of arsenic, for example, a slightly basic pore water pH reduces conversion of arsenate ($As^{5+}$) to arsenite ($As^{3+}$).

A suitable agent for increasing ANC preferably comprises $CaCO_3$. A suitable source of $CaCO_3$ is water softening sludge. More preferably, the agent comprises limestone, which can be high calcium limestone or dolomitic limestone. Depending on site-specific situations, the agent can also comprise a slow release oxidizing agent, such as $MgO_2$, $CaO_2$, or a reducing agent, such as zero valent iron ($Fe^0$) to control the flowing groundwater pH as well as its oxidation-reduction potential (ORP). Alternatively, a quick acting agent for control of ORP, such as an oxidizer, including but limited to a peroxide, a percarbonate, a persulfate, or a permanganate, or a reducer, including but not to a sulfide, a sulfite, a thiosulfate, a dithionate, or ferrous sulfate, can also be added to the agent to effect quicker ORP control in the pore water. Still further suitable ANC compounds can include lime, cement, dolomitic lime, limestone, dolomite, magnesium oxide, sodium hydroxide, potassium hydroxide, and combinations thereof. The amount of the agent used to achieve the desired ANC will vary depending on the material being treated and its pore water characteristics, as well as the water quality and flow characteristics of potential groundwater influx.

In a preferred embodiment of the present invention, the pore water pH is controlled by incorporating a reserve ANC in the treated waste during the waste stabilization process. By way of example, the method can be practiced on a stabilized, pore water-containing arsenic-contaminated matrix, for example, by intimately mixing the stabilized matrix with $CaCO_3$, preferably in the form of limestone so as to maintain an acid neutralization capacity (ANC) of at least about 1,000 mg/kg, preferably at least about 5,000 mg/kg, and still more preferably at least about 10,000 mg/kg, so that the pore water pH is maintained at a slightly basic range (approximately 7-8) for an extended, indefinite period to provide permanent stabilization of the waste matrix. The skilled artisan can determine the permanency of the stabilized matrix using the US EPA MEP test (or modified MEP test) or by serial analysis of dissolved metal concentration in the groundwater over time.

The amount of treatment chemical (e.g., $CaCO_3$) needed to maintain a desired uniform ANC throughout a large body of material stabilized for disposal can render the process cost-prohibitive. In this scenario, the matrix can be stabilized to meet any regulatory site-specific treatment criteria or test (such as USEPA Toxicity Characteristic Leaching Procedure [TCLP], Multiple Extraction Test [MEP], Synthetic Precipitation Leaching Procedure [SPLP], ASTM water leach test, California Wet Extraction Test [WET], and a site-specific test to meet a federal drinking water standards, etc.) and disposed on-site. After treatment, the stabilized matrix will be characterized by low leaching potential for the treated metals and a certain minimum ANC value. For long-term control of the pore water pH, the matrix may simultaneously be treated with a low, economically feasible dosage of limestone prior to disposal. Additional long-term pore water pH control may be accomplished by placing a permeable barrier comprising an ANC-increasing agent such as $CaCO_3$, or limestone, in the path of the groundwater flow upstream of the disposed stabilized matrix such that the groundwater flows through the barrier (e.g., perpendicular to the direction of groundwater flow). The pH of any groundwater flowing into the disposed treated stabilized matrix is modulated by the permeable limestone barrier, thereby providing the necessary pore water pH control. The use of a limestone barrier provides a stable, long-term permanent pH control of any incoming groundwater providing long-term permanency to the stabilized metal-contaminated waste material.

One or more additional barriers can be placed throughout the disposed stabilized matrix such that the groundwater flows through the barrier to influence the pore water pH of downgradient material. In addition, a permeable limestone barrier may be placed on top of the disposed matrix as a cover to modulate the pH of any surface or rain water infiltration.

The permeable limestone barriers can be placed at the disposal site by cutting trenches and placing limestone pebble in the trench or by injecting limestone slurry.

The mass of limestone in the permeable barrier depends upon the flow and chemical characteristics of the groundwater, and site logistics so that a long-term, permanent groundwater pH modulation is achieved. The nature of these factors, and adjustments to the method that account for these factors, will be understood by the skilled artisan.

The concept of long-term, permanent pore water pH control of treated waste material to ensure long-term stability of disposed metal-contaminated matrix material according to the present invention can be used effectively for various heavy metals, including lead, cadmium, zinc, arsenic, chromium, and combinations thereof.

The invention is also particularly applicable for preventing contaminant mobilization from mine tailings impoundments by placing the ANC-containing material above (e.g., on top of) the tailings impoundment or in the path of the groundwater flow upstream of the impoundment. Optionally, the tailings can be mixed before placement in the impoundment with nominal doses (such as about 0.1 to about 15 percent by weight) of limestone and rock phosphate to meet specific treatment leachability criteria. Alternatively, a phosphate solution or slurry and an alkali solution or slurry may be added or injected to the impoundment to treat any existing low pH pore water associated with the tailings impoundment.

In a further variation, the ANC-containing material can be supplemented with other treatment agents as are known to those skilled in the art, including, without limitation, phosphate compound(s), inorganic oxidation-reduction potential (ORP) control agents, or organic carbon sources such as sewage sludge, digested sludge, compost and the like. Suitable phosphate sources can include synthetic hydroxyapatite, natural rock phosphate(s), triple superphosphate, dicalcium phosphate, soluble phosphates (ammonium, sodium, and the like), hexametaphosphate, fish bones, bone meal and combinations thereof.

It is also noted that a mixture of low- and high-soluble alkali and phosphates may be used in the stabilization process. The high-soluble fraction can provide rapid pore water treatment while the low-soluble fraction can provide long-term source of the additives.

DETAILED DESCRIPTION OF THE PREFERRED EMBODIMENTS

In a preferred embodiment of the present invention, a lead- and arsenic-contaminated matrix body present below groundwater table can be stabilized by a stepwise procedure as follows:

Determine the pH, oxidation-reduction potential, and concentration of components affecting adsorption-coprecipitation (e.g., dissolved iron and aluminum) in the pore water and the heavy metal profile in the matrix Add at least one of a pH control agent (e.g., MgO, $CaCO_3$), ORP control agent (e.g., sodium percarbonate, $H_2O_2$, air, or ozone) to substantially precipitate all dissolved Fe and Al Add adsorption-coprecipitation agent (e.g., iron and/or aluminum salts) to stabilize the heavy metal in the matrix Add limestone to provide reserve ANC. The ANC-increasing agent can be the same as the pH control agent, depending on the initial matrix and pore water characteristics. However it is noted that substantially more of the agent is added for long term storage in a saturated zone than is needed to stabilize the heavy metals.

EXAMPLE

A lead- and arsenic-contaminated waste material site with the following sample characteristics:

|  | SATURATED SOIL | CONTAMINATED GROUNDWATER | BACKGROUND GROUNDWATER |
| --- | --- | --- | --- |
| Arsenic | 62 mg/kg | 26 mg/L | <0.010 mg/L |
| Lead | 14 mg/kg | 0.62 mg/L | <0.0050 mg/L |
| Iron | 3,500 mg/kg | 13,000 mg/L | 0.19 mg/L |
| pH | 3.7 | 1.2 | 8.2 | was treated in accordance with the present invention to control the pore water chemistry to achieve lead and arsenic concentrations in leachate to levels below drinking water standards of 0.015 mg/L for lead and 0.050 mg/L for arsenic. The laboratory analysis of pore water at various levels of treatment were as follows:

| TREATMENT LEVEL | pH | ARSENIC (mg/L) | LEAD (mg/L) | IRON (mg/L) |
| --- | --- | --- | --- | --- |
| 1. Soil saturated with groundwater (GW) | 3.38 | 8.4 | <0.1[1] | 1,300 |
| 2. GW-saturated soil treated with 3 percent by weight limestone and resaturated with background groundwater | 5.24 | <0.005 | <0.1[1] | 1,200 |
| 3. Treatment Level 2 followed by extended oxygenation with air | 7.95 | 0.010 | 0.0055 | <1 |

Note:
[1]High detection limit due to matrix interferences during analysis.

I claim:

1. A method for storing in a saturated zone a leaching-stabilized heavy metal-containing matrix that leaches heavy metal at no more than a preselected level, the method comprising the steps of:

determining pH, adsorption-coprecipitation potential and oxidation-reduction potential of the heavy metal-containing matrix;

determining pH, adsorption-coprecipitation potential and oxidation-reduction potential and flux of the pore water;

treating a heavy metal-containing matrix with at least one of an agent for controlling pH, an agent for controlling oxidation-reduction potential, and an agent for controlling adsorption-coprecipitation in an amount sufficient to form the leaching-stabilized heavy metal-containing matrix; and flowing an agent for increasing the acid neutralization capacity (ANC) of the stabilized matrix into contact with the stabilized matrix, the flowing agent being provided in an amount sufficient to increase the permanence of the stabilized matrix to a preselected level.

2. A method for storing in a saturated zone a leaching-stabilized heavy metal-containing matrix that leaches heavy metal at no more than a preselected level, the method comprising the steps of:

placing the leaching-stabilized matrix in a saturated zone, wherein the matrix is spaced apart from an agent for increasing the acid neutralization capacity (ANC) of the stabilized matrix, and wherein the matrix is also spaced apart from an agent for controlling oxidation reduction potential (ORP) of the matrix; and flowing an amount of the agent for increasing the ANC sufficient to increase the permanence of the stabilized matrix to a preselected level into contact with the stabilized matrix, and wherein the stabilized matrix is also contacted with an amount of the agent for controlling ORP sufficient to control the ORP of pore water in the matrix.

3. A method as claimed in claim 2 further comprising the step of determining the permanence of the stabilized matrix in contact with the agent for increasing the ANC.

4. A method as claimed in claim 3 wherein the permanence is determined by a method selected from the group consisting of a Multiple Extraction Test (MEP) or a groundwater analysis.

5. A method as claimed in claim 2 wherein the agent for increasing the ANC comprises calcium carbonate.

6. A method as claimed in claim 5 wherein the agent for increasing the ANC comprises limestone.

7. A method as claimed in claim 2 further comprising, prior to the placing step, the step of intimately mixing the stabilized matrix and a reserve amount of the agent for increasing the ANC.

8. A method as claimed in claim 2 wherein the agent for increasing the ANC flows into contact with the stabilized matrix in flowing groundwater.

9. A method as claimed in claim 8 wherein the flowing groundwater permeates a permeable barrier that comprises the agent for increasing the ANC.

10. A method as claimed in claim 9 wherein the permeable barrier comprises limestone.

11. A method as claimed in claim 2 wherein the leaching-stabilized matrix leaches heavy metals at a level sufficiently low to meet a regulatory test.

12. A method as claimed in claim 11 wherein the regulatory test is selected from the group consisting of a Toxicity Characteristic Leaching Procedure [TCLP], a Multiple Extraction Test [MEP], a Synthetic Precipitation Leaching Procedure [SPLP], an ASTM water leach test, a California Wet Extraction Test [WET], and a site-specific test to meet a federal drinking water standards.

13. A method as claimed in claim 2 wherein the heavy metal is selected from the group consisting of lead, cadmium, arsenic, zinc and chromium.

14. A method as claimed in claim 2 wherein the stabilized matrix is stored at a subsurface site.

15. A method as claimed in claim 14 wherein the agent for increasing the ANC flows into contact with the stabilized matrix in groundwater.

16. A method as claimed in claim 14 wherein the agent for increasing the ANC is provided on top of the stabilized matrix, so that water that contacts the stabilized matrix comprises the agent for increasing the ANC.

17. A method as claimed in claim 14 wherein the matrix is stored in a mine tailings impoundment.

18. A method as claimed in claim 2 wherein a plurality of barriers comprising the agent for increasing the ANC is spaced from the matrix.

19. A method for storing in a saturated zone a leaching-stabilized heavy metal-containing matrix that leaches heavy metal at no more than a preselected level, the method comprising the steps of:

placing the leaching-stabilized matrix in a saturated zone, wherein the matrix is spaced apart from an agent for increasing the acid neutralization capacity (ANC) of the stabilized matrix, and wherein the matrix is also spaced apart from an agent for controlling oxidation reduction potential (ORP) of the matrix; and flowing an amount of the agent for increasing the ANC sufficient to increase the permanence of the stabilized matrix to a preselected level, wherein the stabilized matrix is also contacted with an amount of the agent for controlling ORP sufficient to control the ORP of pore water in the matrix, and wherein the matrix is stored at a location above a groundwater level.

20. A method as claimed in claim 19 wherein the agent for increasing the ANC is spaced apart from and on top of the stabilized matrix, so that water that contacts the stabilized matrix from above comprises the agent for increasing the ANC.

21. A method as claimed in claim 20 wherein the matrix is stored in a mine tailings impoundment.

* * * * *